Feb. 5, 1929.
J. M. SCOTT ET AL
1,701,311
COMBINED FILLING NOZZLE AND WHISTLE
Filed May 7, 1928
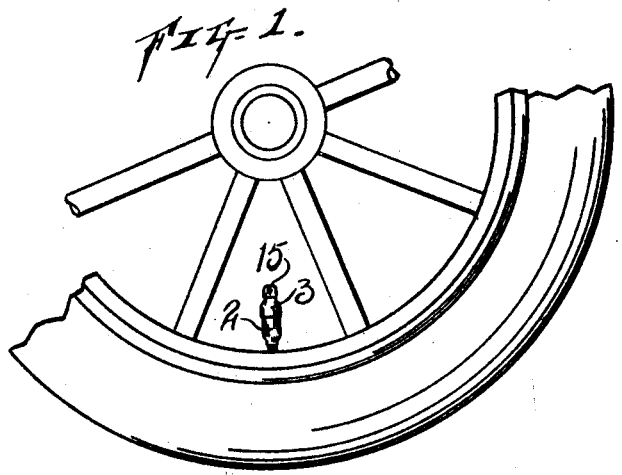
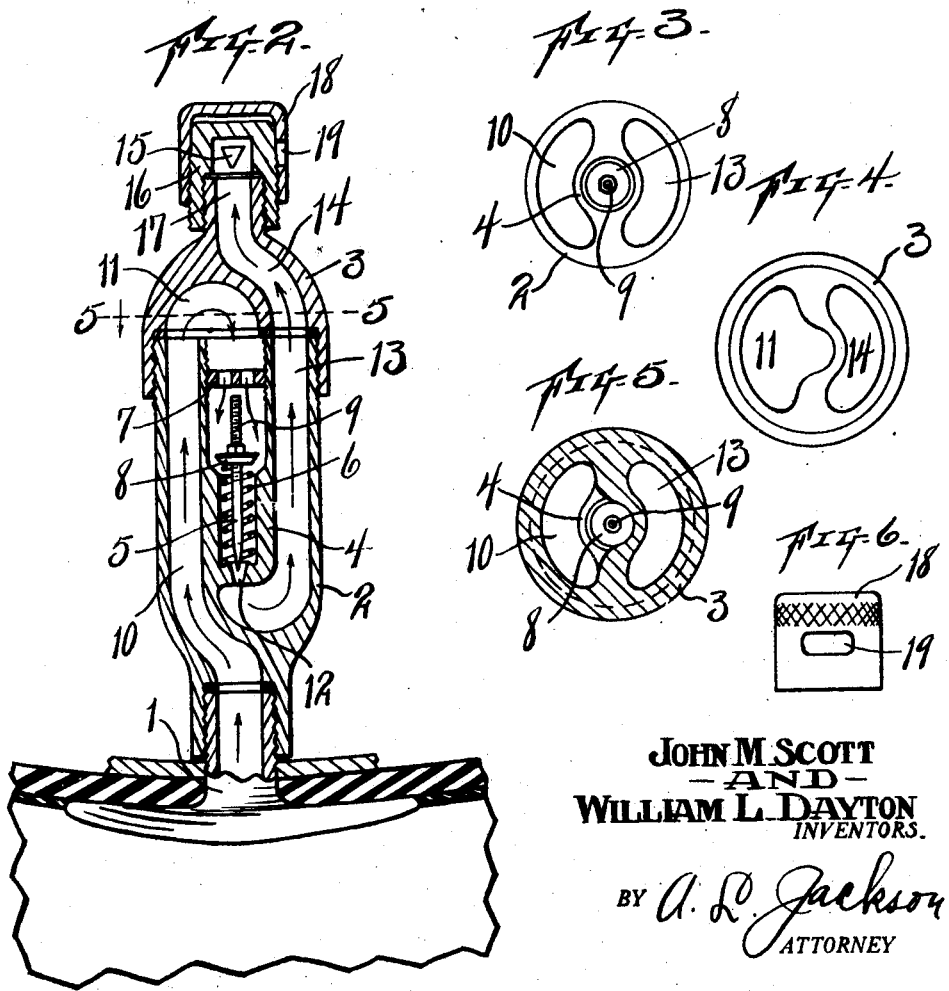
JOHN M. SCOTT
AND
WILLIAM L. DAYTON
INVENTORS.
BY A. L. Jackson
ATTORNEY Patented Feb. 5, 1929.

1,701,311

UNITED STATES PATENT OFFICE.

JOHN M. SCOTT AND WILLIAM L. DAYTON, OF FORT WORTH, TEXAS.

COMBINED FILLING NOZZLE AND WHISTLE.

Application filed May 7, 1928. Serial No. 275,613.

Our invention relates to signal devices and more particularly to signal devices for the protection of inner tubes and casings of pneumatic tires; and the object is to provide a simple device for connecting to a wheel rim and to a tire casing to warn the driver when there is a puncture and thus give the driver an opportunity to save the tire casing and inner tube and to provide a device which can be used both as a filling nozzle and a signal device. Other objects and advantages will be fully explained in the following description and the invention will be more particularly pointed out in the claims.

Reference is had to the accompanying drawings which form a part of this application.

Fig. 1 is a side elevation of a portion of a wheel with the improved signal-filler device applied thereto.

Fig. 2 is an enlarged vertical section of the same and a section of a portion of a tire casing.

Fig. 3 is a plan view of the body of the signal and filler.

Fig. 4 is an inverted plan view of the sealing or closing member.

Fig. 5 is a horizontal section of the signal-filler device taken on the line 5—5 of Fig. 2.

Fig. 6 is a detail view of a mud cap.

Similar characters of reference are used to indicate the same parts throughout the several views.

This invention is provided with a socket member 1 of the usual type. The body of the device is made in two parts,—part 2 being threaded interiorly at the socket engaging end to be screwed on the socket member 1 and the part 3 being a cap for the body 2. The cap 3 is screwed on the body 1. The body 2 incloses a valve chamber 4 which is formed integral therewith. A valve 5 is provided and a spring 6 is provided for opening the valve 5. A spider 7 is mounted in the upper part of the valve chamber to prevent displacement of the valve 5 and spring 6. A compression plate or disk 8 is mounted on the valve stem 9. Air passages are provided in the body 2 and cap 3 and through the valve chamber 4. The arrow heads in the duct 10 indicate the course of the air in escaping from a tire. The air passes on through a cavity 11 in the body cap 3. The air then passes through the spider cap 7 and through the valve chamber 4. If the air is above twenty pounds pressure, the plate 8 will be forced by the air to compress the spring 6 and so close the port 12. If the air pressure goes as low or lower than twenty pounds, the spring 6 overcomes the air pressure and raises the valve 5 from the port 12 and so let the air escape. This will cause the whistle to sound in the manner shown hereinafter. The escaping air will pass through the duct 13 in the body 2 and through the duct 14 in cap 3. The device is provided with a whistle 15 which is screwed on the reduced portion of the body cap 3. When the air in the tire becomes twenty pounds or less pressure, the spring 6 will open the valve 5 and the escaping air will sound the whistle through the aperture 15. The whistle is formed in a cap 16. This cap can be removed and the tire inflated by connecting a hose to the intake nozzle 17. The device is provided with a mud cap 18 which is provided with a slot 19. Ordinarily the escaping air will pass through nozzle 17 and whistle 15, and through the slot 19. In case of muddy conditions the cap 18 can be turned so that the whistle aperture 15 will be closed.

What we claim, is,—

1. A signal for pneumatic tires comprising a body connected to a tire and provided with a combined inward and outward air passage therein and a valve chamber therein, a body cap fixedly mounted on said body and provided wtih a combined inward and outward air passage registering with the passages in said body, a spring-actuated valve in said valve chamber and held closed until the pressure goes below a predetermined amount of pressure, and a cap provided with a whistle connected to said body cap for escape of air and to sound or give an alarm or signal.

2. A combined signal and filling nozzle comprising a body connected to a tire and communicating therewith, a valve chamber formed centrally in said body and a valve therein, said body having a combined inward and outward air passage therethrough and through said valve chamber, said valve having a stem and a compression plate mounted thereon for holding said valve closed for normal working conditions of the pressure in a tire casing, a cap provided with a whistle connected to said body cap, and a spring for opening said valve when the pressure goes below normal working conditions.

3. A combined signal and filling nozzle for pneumatic tires comprising a body connected to a tire and provided with a combined inward and outward air passage therethrough, a valve chamber formed centrally in said casing, a valve mounted in said chamber and provided with a valve stem, a compression plate mounted on said stem and adapted to hold said valve closed in normal working conditions of pressure in the tire casing, a whistle connected to said nozzle for escape of air, a spring mounted on said valve for opening said valve in case the air goes below the normal pressure in said casing, and a mud cap for said whistle.

4. A combined filling and signal nozzle for pneumatic tires comprising a body connected to a tire, a valve chamber centrally within said body and integral with said body, said body having air passage communicating with the interior of a tire and extending upwardly above said valve chamber and said valve chamber forming a continuation of the said air passage and said body having an air passage leading from the bottom of said air chamber and forming a continuation of said air passage upwardly and out at the top of said body, a valve in said valve chamber adapted to close the passage through said valve chamber, a valve stem therefor, a pressure plate rigid with said stem for pressing said valve downwardly for closing the passage through said chamber during the normal operation of a tire, a spring on said stem adapted to open said valve when the pressure is reduced to a predetermined limit, a cap screwed on said body and provided with an air passage registering with the air passage of said body, and a whistle carried by said cap to be actuated by the escaping air.

In testimony whereof, we set our hands, this 3rd day of May, 1928.

JOHN M. SCOTT.
WILLIAM L. DAYTON.